(12) United States Patent
Kim et al.

(10) Patent No.: US 7,373,163 B2
(45) Date of Patent: May 13, 2008

(54) APPARATUS AND METHOD FOR MEASURING THERMAL NOISE POWER IN A MOBILE COMMUNICATION SYSTEM

(75) Inventors: Tai-Suk Kim, Seoul (KR); Sung-Kwon Jo, Suwon-si (KR); Ki-Seob Hong, Suwon-si (KR); Jang-Hoon Yang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 10/777,245

(22) Filed: Feb. 13, 2004

(65) Prior Publication Data

US 2004/0162101 A1 Aug. 19, 2004

(30) Foreign Application Priority Data

Feb. 14, 2003 (KR) .................. 10-2003-0009391

(51) Int. Cl.
*H04B 7/005* (2006.01)

(52) U.S. Cl. .................. 455/522; 455/69; 455/67.11

(58) Field of Classification Search ........... 455/522, 455/69, 423, 424, 70, 67.11, 67.14
See application file for complete search history.

(56) References Cited

U.S. PATENT DOCUMENTS 6,442,398 B1* 8/2002 Padovani et al. ......... 455/522

* cited by examiner

*Primary Examiner*—Philip J. Sobutka
(74) *Attorney, Agent, or Firm*—Roylance, Abrams, Berdo & Goodman, LLP

(57) ABSTRACT

An apparatus and method for accurately measuring the thermal noise power of a silence period and increasing the control efficiency of reverse link load in a mobile communication system. In the received power measuring apparatus, a UPMB measures the received power of the reverse link, accumulates the measured received power, and outputs the accumulated received power as a received power value. A remover compensates the received power value using a time constant if the received power value is for a silence period. A controller provides a silence period signal to the remover when the silence period starts.

9 Claims, 6 Drawing Sheets

APPARATUS AND METHOD FOR MEASURING THERMAL NOISE POWER IN A MOBILE COMMUNICATION SYSTEM

PRIORITY

This application claims priority under 35 U.S.C. § 119 to an application entitled "Apparatus and Method for Measuring Thermal Noise Power in a Mobile Communication System" filed in the Korean Intellectual Property Office on Feb. 14, 2003 and assigned Serial No. 2003-9391, the contents of which are incorporated herein by reference.

BACKGROUND OF THE INVENTION

1. Field of the Invention

The present invention relates generally to an apparatus and method for measuring noise power in a high-speed data transmission system, and in particular, to an apparatus and method for measuring thermal noise power in an Evolution-Data Only (1xEV-DO) base transceiver system (BTS).

2. Description of the Related Art

In general, mobile communication systems provide voice service as a basic service and data service as an additional service. Current users of mobile communication systems demand transmission of more data at higher rates from the mobile communication systems. To meet the users' demand, 1xEV-DO has emerged to support high-speed packet data transmission. Like general mobile communication systems, the 1xEV-DO system transmits/receives data to/from mobile stations (MSs) via radio channels. Therefore, a BTS assigns radio resources to the MSs in order to provide service to them. Communications are available through assignment of communication resources, i.e., radio channel resources. This is the most conspicuous difference between mobile communication and wired communication. For wired communication systems, a dedicated line is connected to each terminal irrespective of whether the terminal uses the line. In contrast, in wireless communication systems, communication service is possible only when channel resources are assigned to the mobile terminals in a radio environment. Consequently, if all radio resources are occupied, a new call cannot be connected, and the data rate of a presently on-going call cannot be increased either.

If the BTS assigns more radio resources to some users than available, interference with other users within the BTS increases, which seriously affects the quality of service provided to them. Moreover, the service quality for users serviced in neighboring BTSs also deteriorates. Hence, the BTS must precisely determine currently available radio resources according to channel conditions, and assign radio resources correspondingly. This is one of the very significant roles of the access nodes (AN).

$2^{nd}$ generation (2G) mobile communication systems, which support voice service and low-speed data service, provide traffic data at relatively low rate. A high-speed data transmitting mobile communication system such as 1xEV-DO, however, transmits a large volume of data at high rate on both forward and reverse links. "Forward" is the direction from a BTS to an MS and "reverse" is the direction from the MS to the BS. In the high-speed data transmission, adverse effects on MSs in service in a current BTS and other BTSs are mitigated by reliable assignment and limiting of radio resources. Appropriate assignment of radio resources prevents the degradation of service quality for other MSs, or impossible provisioning of service itself. Numerous studies are being actively conducted on the addition of high-speed data services with the traditional voice calling on reverse links in the present 1xEV-DO system. Service quality is a significant factor to the voice call. In this context, appropriate assignment of radio resources is increasingly important.

Mobile communication systems deployed thus far generally assign low rate radio resources to voice services and slightly higher rates to data services. Thus, radio resources are assigned and limited based on measured reverse link load. Considering the requirement of radio resources for high-speed data transmission, the simple load measuring method is not effective in appropriately limiting the load. To overcome this problem, a method of measuring transmit power on the reverse link separately for a non-silence period and a silence period was proposed for the 1xEV-DO system. The non-silence and silence periods in the 1xEV-DO system will be described in greater below.

FIG. 1 illustrates the non-silence period and the silence period as defined in the 1xEV-DO system. With reference to FIG. 1, the silence and non-silence periods will be described in terms of noise power and available load.

As illustrated, the 1xEV-DO system operates separately in the non-silence period and the silence period. They can be set to alternate periodically according to a time interval set by the system. Alternatively, the silence period can be set to a preset time period. The silence period lasts for a predetermined short time (T). For the silence period, no MSs transmit signals on the reverse link. This implies that there is no power loaded on the reverse link. Even in this state, thermal noise power exists due to radio noise inherent to the environment according to the position of a BS. The power of the silence period illustrated in FIG. 1 corresponds to thermal noise power. An effective load power, as well the thermal noise power, exists for the non-silence period because of power transmitted from the MSs. The effective load power is the load imposed on the reverse link by data transmission from the MSs. This can also be referred to as the rise over thermal (ROT) power illustrated in FIG. 1.

With reference to FIG. 2, power control on the reverse link in a 1xEV-DO BTS will be described. FIG. 2 is a flowchart illustrating a method of controlling the reverse link power in a 1xEV-DO BS.

Referring to FIG. 2, the BTS measures received power on the reverse link in step 200. The power measurement is the total load of the reverse link which includes the ROT and the thermal noise power, as illustrated in FIG. 1. In the former case, an available load is not accurately determined because infrequently-varying thermal noise power is considered a noise variable with control in the BS. Thus, it is preferable to control the reverse load by measuring the ROT. In this sense, the received power measured in step 200 is the ROT.

While measuring the ROT, the BTS decides whether it is time to broadcast an reverse activity bit (RAB) in decision step 202. If it is ("Yes" path from decision step 202), the BTS decides whether the ROT measurement is less than a predetermined threshold in order to control the rates of reverse data from MSs in decision step 204. If the ROT is less than the threshold ("Yes" path from decision step 204), the BTS sets the RAB to "0" to increase the data rates of the MSs in step 206. On the contrary, if the ROT is greater than the threshold ("No" path from decision step 204), the BTS sets the RAB to "1" to decrease the data rates of the MSs in step 208.

After setting the RAB in step 206 or 208, the BTS broadcasts the RAB to all the MSs that transmit data on the reverse link, to thereby control their data rates in step 210.

As described above, the BTS detects the ROT by measuring the received power on the reverse link. The ROT is calculated by subtracting the thermal noise power of the silence period illustrated in FIG. 1 from the total received power measurement. An unchangeable power measuring block (UPMB) used to measure the received power in the BTS measures the instantaneous power of a signal received at an antenna. This UPMB will be described with reference to FIG. 3. FIG. 3 is a block diagram of a typical UPMB for the BS.

Referring to FIG. 3, a UPMB 300 measures the power of a signal received from an antenna (ANT) after predetermined processing or without any processing. In the illustrated case and the following description, it is assumed that there is no processing preceding the power measuring. A power detector 301 of the UPMB 300 measures the received power of the reverse link and outputs the received power at any particular moment. Since peak power is produced instantaneously in a radio environment, power varies greatly from moment to moment. Therefore, the instantaneous power value from the power detector cannot be used without further processing. The UPMB 300 is thus equipped with an average calculator 302 for calculating an average power. The power detector 301 feeds the instantaneous power value to the average calculator 302 and the average calculator 302 accumulates received power values for a predetermined time and calculates the average of the accumulated power values. The average power output of the UPMB 300 is used as a received power measurement.

A controller 311 controls reverse link power and reverse data rates based on the power measurement received from the average calculator 302.

The average calculator 302 can be configured in either a digital or analog circuit. If the average calculator 302 is configured as an analog circuit, as is generally the case, the average calculator 302 is comprised of an integrator with resistors and condensers. Even if the average calculator 302 is configured as a digital circuit, it can calculate the average power when implemented as an integrator. The use of an integrator as the average calculator 302, however, is not capable of precisely measuring the thermal noise power in the silence period illustrated in FIG. 1. With reference to FIG. 4, errors involved in measuring the thermal noise power of the silence period will be described.

FIG. 4 is a timing diagram illustrating power measured for the non-silence period and the silence period in the UPMB of the BS that will be referred to for describing power measurement errors.

In an actual 1xEV-DO system, there is no power artificially loaded on the reverse link for the silence period, as described before with reference to FIG. 1. The reason for setting the silence period is to precisely measure the thermal noise power and to appropriately control the data rate of the reverse link based on the measurement. When the average calculator 302 is implemented as an integrator however, it cannot follow rapid power changes, such as the square wave illustrated in FIG. 1. If a power signal is presented in the form of a square wave, the integrator will output power values that reflect a parabola as indicated by the bold line shown in FIG. 4. Therefore, a power measurement error is generated, as illustrated in FIG. 4. This error varies with the time constant of the average calculator 302. If the time constant is greater than 26.67 ms, 55.33 ms, or 80 ms, which are the duration's of a silence period as provided in the 1xEV-DO system, the thermal noise power cannot be measured accurately.

An inaccurate thermal noise power measurement has adverse effects on ROT assignments, leading to inappropriate control of the reverse link. As a result, there is no reason for setting the silence period. Consequently, communication quality is degraded for users in other sectors or BTSs, or users within the same sector or BTS.

Recently, techniques have been developed that measure the ROT accurately by separating the silence period and the non-silence period. However, many mobile communication systems have been deployed and are providing services which do not or cannot incorporate these techniques for ROT power measurement. Hence, substituting the UPMBs 300 in BTSs will cost a great deal and waste time as well.

SUMMARY OF THE INVENTION

An object of the present invention is to substantially solve at least the above problems and/or disadvantages and to provide at least the advantages below. Accordingly, an object of the present invention is to provide an apparatus and method for accurately detecting thermal noise power.

Another object of the present invention is to provide an apparatus and method for accurately detecting the thermal noise power of a silence period based on the power measurement of the silence period.

A further object of the present invention is to provide an apparatus and method for increasing the control efficiency of reverse link load through precise detection of the thermal noise power of a silence period.

The above objects are achieved by providing an apparatus and method for accurately measuring the thermal noise power of a silence period and increasing the control efficiency of a reverse link load in a mobile communication system.

According to one aspect of the present invention, in the received power measuring apparatus, a UPMB measures the received power of the reverse link, accumulating the measured received power, and outputs the accumulated received power as a received power value. A remover compensates the received power value using a time constant if the received power value is for a silence period. A controller provides a silence period signal to the remover when the silence period starts.

According to another aspect of the present invention, a received power measuring method is provided wherein the received power of the reverse link is measured, accumulated, and output as a received power value. The received power value is compensated using a time constant if the received power value is for a silence period and the compensated received power value is output as a thermal noise power value for the silence period. The ROT power is calculated using the received power value measured for a non-silence period and the thermal noise power value of the silence period.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 5:
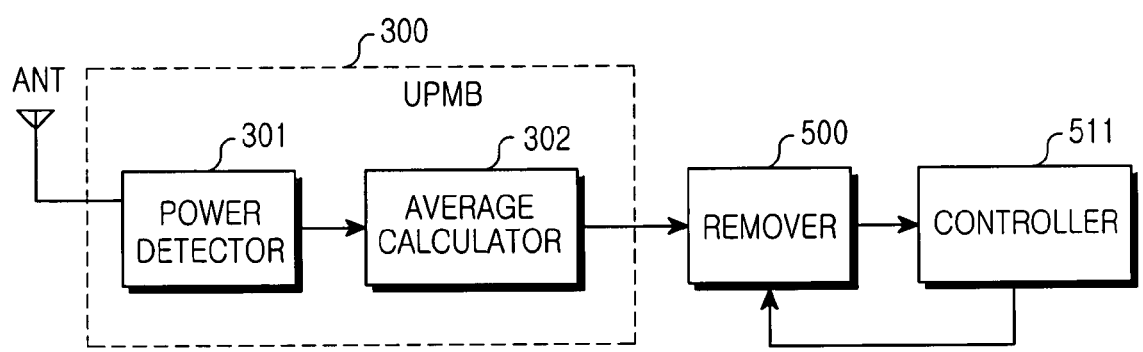
FIG. 5 is a block diagram of a power detecting apparatus according to an embodiment of the present invention.

FIG. 5 is a block diagram of a power detecting apparatus according to an embodiment of the present invention. The structure and operation of the power detecting apparatus will be described with reference to FIG. 5.

Figure 3:
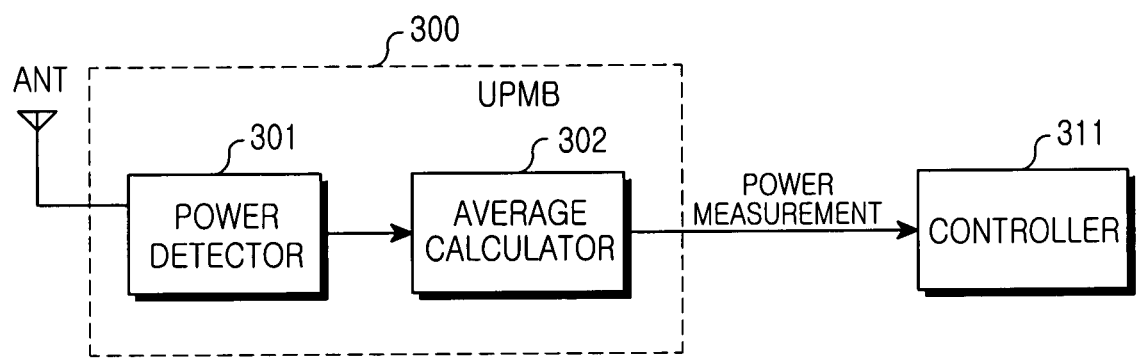
FIG. 3 is a block diagram of a typical UPMB in the BS.
Figure 4:
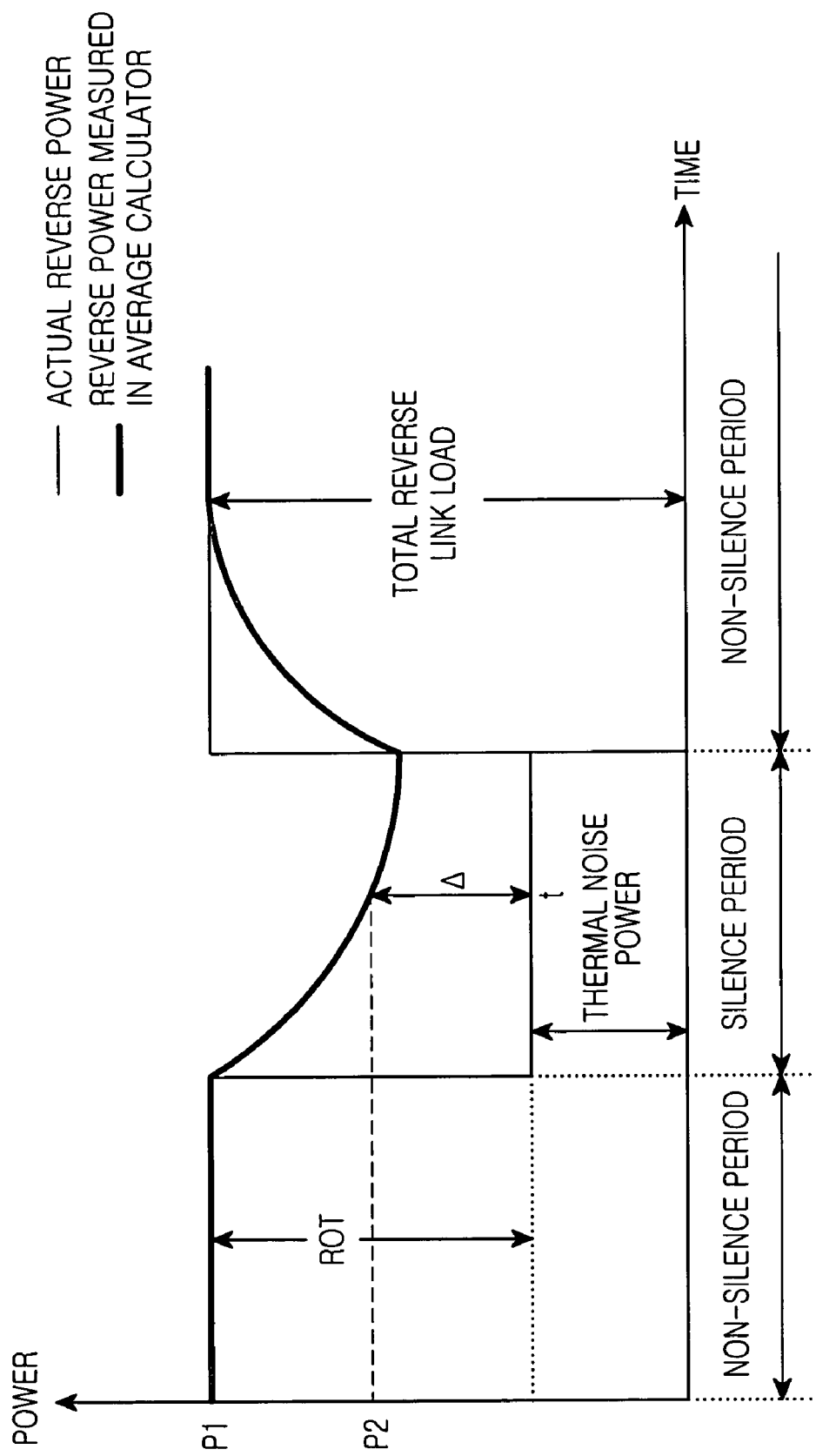
FIG. 4 is a timing diagram illustrating power measurement errors when measuring power in the non-silence period and the silence period in the UPMB of the BS.

Referring to FIG. 5, the UPMB 300 measures the power of a reverse signal received from an antenna (ANT) with the same configuration and structure as illustrated in FIG. 3. The power detector 301 measures the instantaneous power of the reverse link and the average calculator 302 integrates instantaneous power values received from the detector 301 and outputs the average of the power values as a measurement signal. A remover 500 is further provided according to the embodiment of the present invention. The remover 500 ordinarily outputs the measurement signal received from the average calculator 302 to controller 511. Upon receipt of a silence period control signal from the controller 511, the remover 500 measures the actual thermal noise power by removing an error signal of Δ as illustrated in FIG. 4 from the measurement signal. The controller 511 reflects the thermal noise power measurement received from the remover 500 in current thermal noise power and controls the power of the reverse link for the non-silence period based on the updated thermal noise power value.

The controller 511 generally has information about the non-silence period and the silence period. Therefore, the silence period control signal provided from the controller 511 to the remover 500 indicates the start and end of the silence period. Upon receipt of the silence period information, the remover 500 outputs the power measurement from which the error is removed. A description will now be made of how the remover 500 removes the error.

The time (t)-varying power measurement error Δ for the silence period as illustrated in FIG. 4 varies with the time constant of the average calculator 302 that is an integrator. Hence, the time constant of the average calculator 302 can be determined in advance and is denoted by T. The power value measured at the end time of the non-silence period is represented by P1 [dBm] and the power value output from the average calculator 302 in the silence period is represented by P2 [dBm]. As illustrated in FIG. 4, P2 varies with time. Using P1 and P2, the ROTs of the silence period and the non-silence period, $ROT_{silence}$ and $ROT_{non-silence}$ are computed by $$ROT_{silence} \text{ [dB]} = ROT_{non-silence} - ROT_{non-silence} \cdot \exp(-t/T) \quad (1)$$

$$= P1 - P2$$

$$ROT_{non-silence} \text{ [dB]} = \frac{P1 - P2}{1 - \exp(-t/T)}$$

From Eq. (1), the power measurement error Δ for the silence period is $$\Delta = (ROT_{non-silence}) \cdot \exp(-t/T) \quad (2)$$

$ROT_{non-silence}$ shown in Eq. (1) is ROT[dB] of the non-silence period shortly before the silence period. The ROT falls over time in the form of exp(−t/T) for the silence period, as illustrated in FIG. 4. Hence, the power measurement error Δ for a time period t in the silence period is calculated by Eq. (2).

The remover 500 receives information about the start time of the silence period from the controller 511 and calculates the power measurement error Δ over time in the silence period. The remover 500 calculates the thermal noise power of the silence period by subtracting the calculated power measurement error Δ from a received power value for the silence period, as illustrated in FIG. 4. Upon receipt of the silence period start time signal from the controller 511, the remover 500 processes the signal received from the average calculator 302 by $$P2 - \Delta = P2 - (ROT) \cdot \exp\left(\frac{-t}{T}\right) \quad (3)$$

and outputs the computation result to the controller 511. This operation occurs from the time the silence period start time signal is received to the time the silence period end time signal is received from the controller 511. The silence period start time signal and the silence period end time signal can be incorporated as high and low logic levels of a single signal. The signal is high when the silence period starts and transitions to low when the silence period ends. The remover 500 can be configured such that the output of the average calculator 302 bypasses the remover 500. The controller 511 can be equipped with a bypass line from the remover 500. The output of the average calculator 302 is switched to the remover 500 for the silence period and to the bypass line for the non-silence period. A switching signal is supplied from the controller 511 as illustrated in FIG. 5. Alternatively, a separate device can be used to apply the switching control signal for controlling switch on/off according to the non-silence period or the silence period.

The embodiment of the present invention can be realized without implementing the remover 500 in hardware. The controller 511 can perform the function of the remover 500. Instead of the remover 500, the controller 511 can process the signal received from the average calculator 302. This will be described along with reverse power control with reference to FIG. 6.

Figure 6:
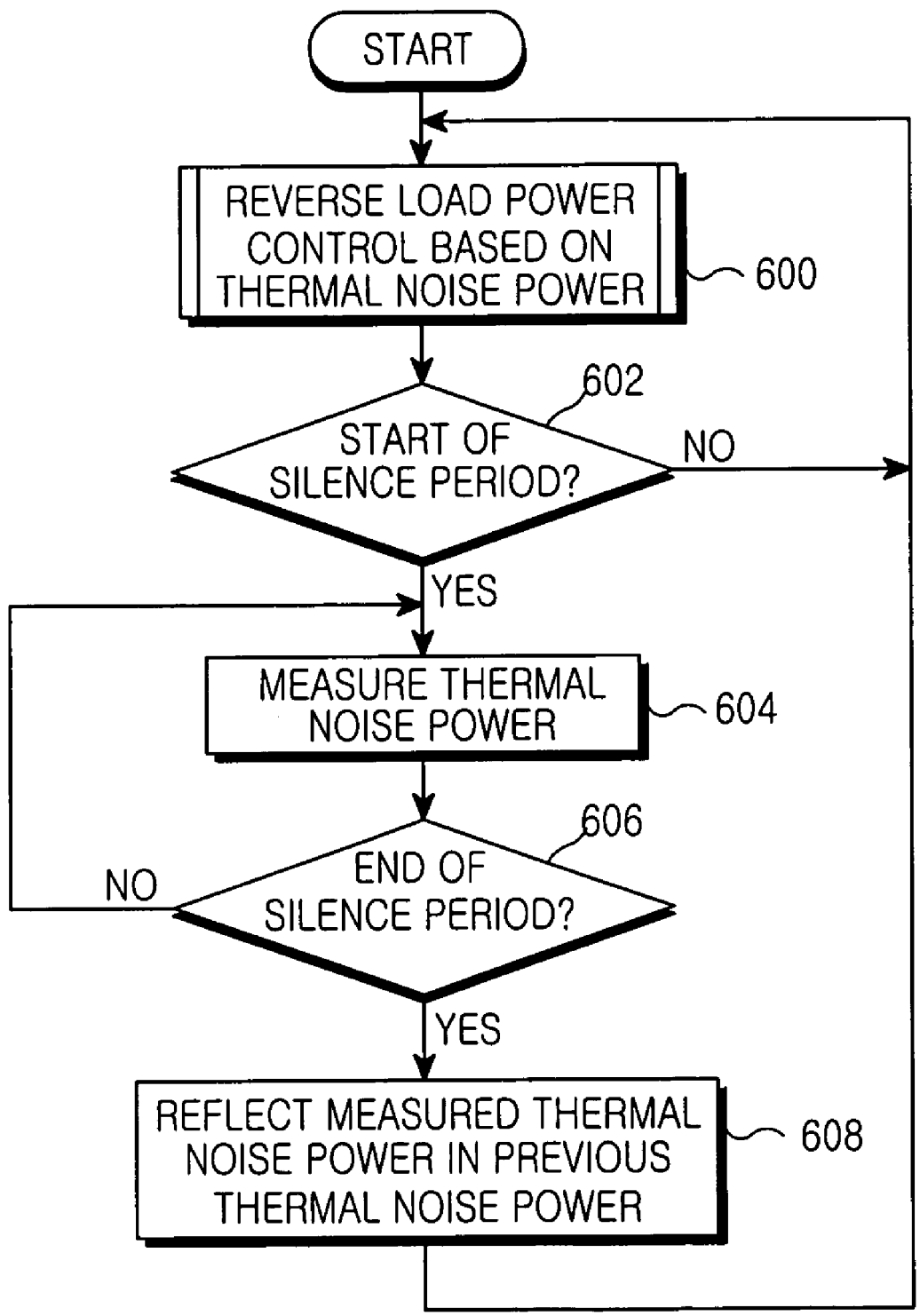
FIG. 6 is a flowchart illustrating an operation for measuring thermal noise power and controlling reverse link power based on the thermal noise power measurement according to another embodiment of the present invention.

FIG. 6 is a flowchart illustrating an operation for measuring thermal noise power and controlling reverse link power based on the thermal noise power measurement according to another embodiment of the present invention.

Figure 1:
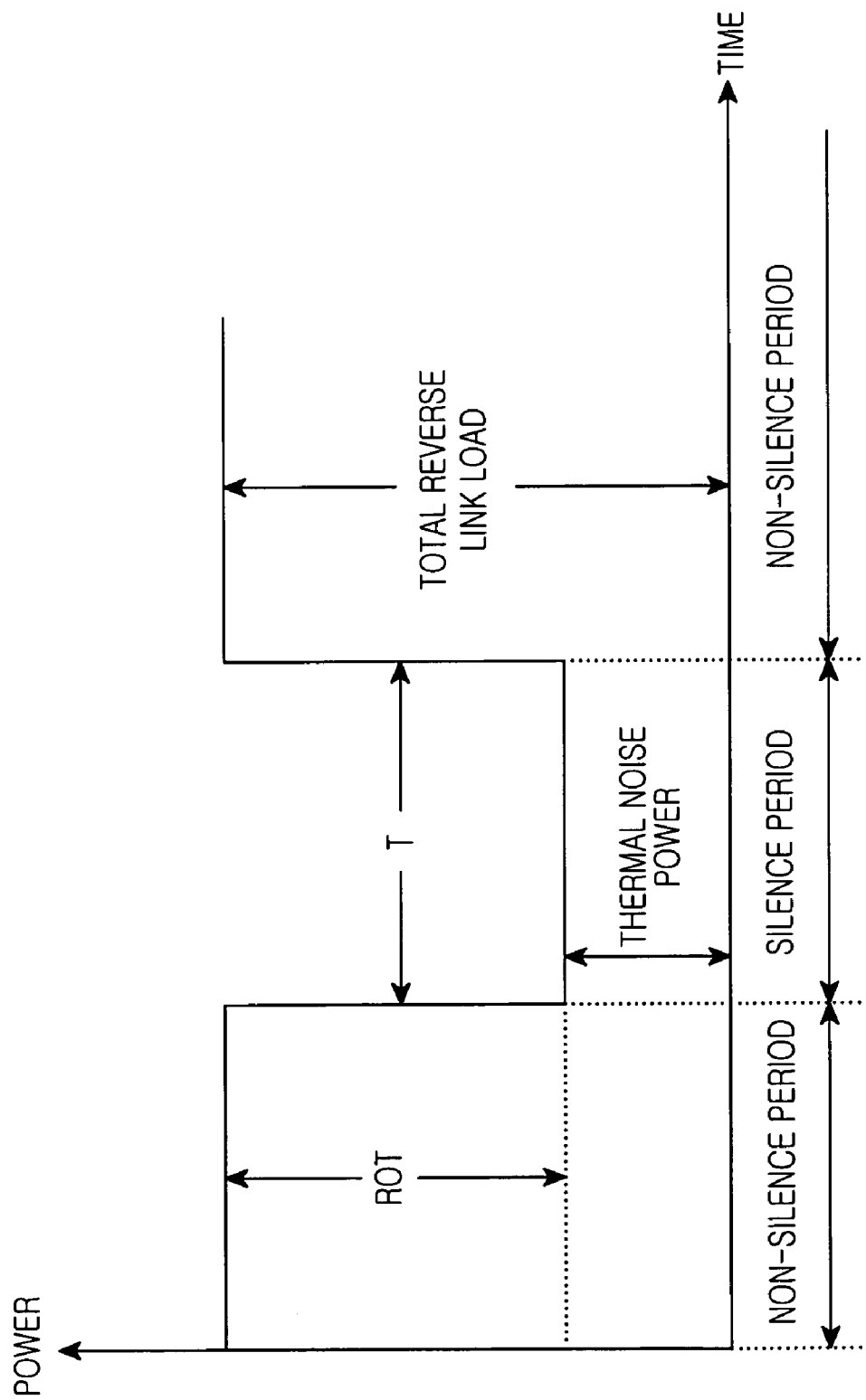
FIG. 1 illustrates a non-silence period and a silence period as defined in a 1xEV-DO system.
Figure 2:
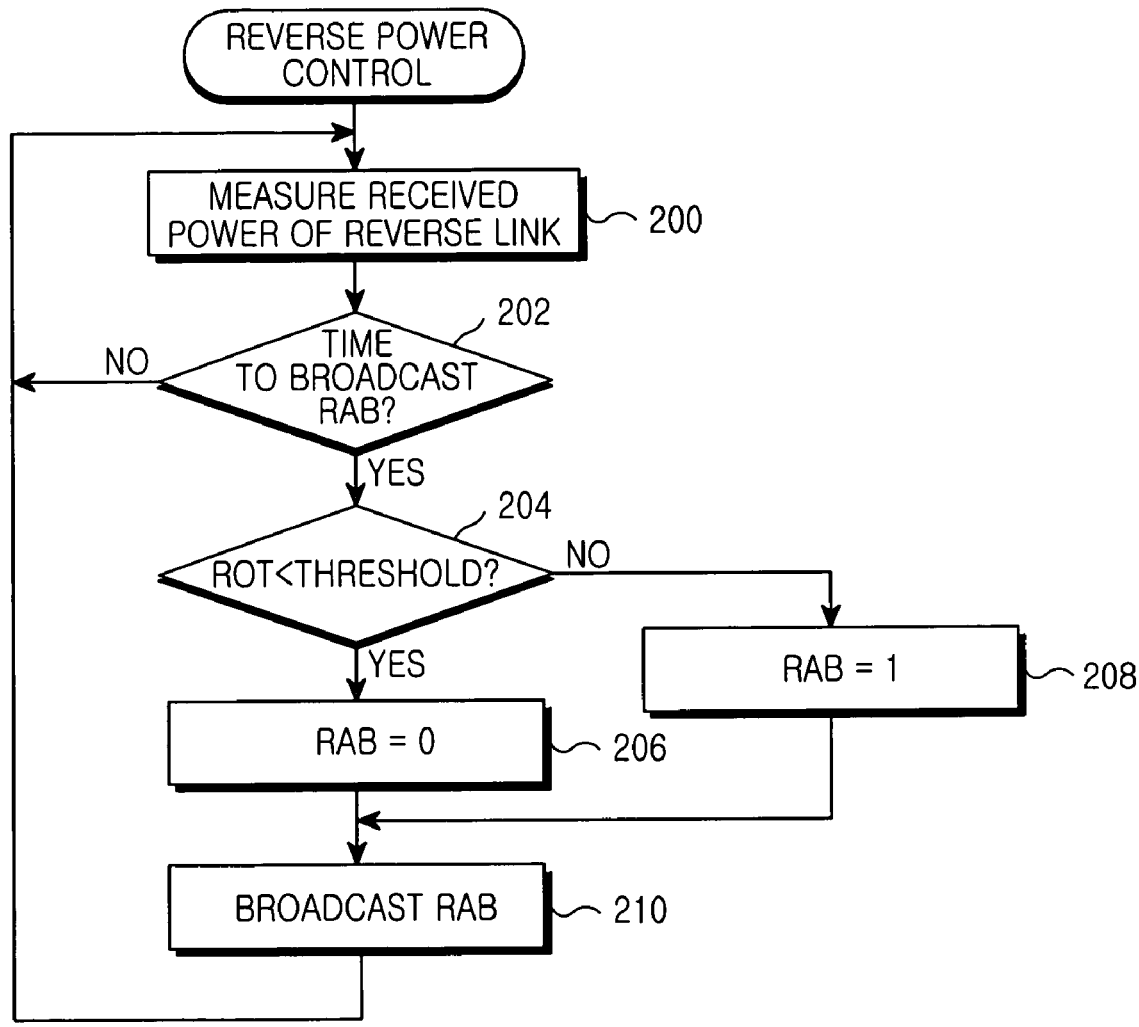
FIG. 2 is a flowchart illustrating an operation for controlling reverse link power in a BTS of the 1xEV-DO system.

Referring to FIG. 6, the controller 511 performs a reverse load power control based on previously calculated thermal noise power in step 600. The reverse load power control is the process of controlling the reverse data rates of MSs by an RAB as illustrated in FIG. 2. In decision step 602, the controller 511 decides whether the silence period has started. As stated earlier, since the controller 511 already has knowledge of the silence period, it can detect the start time of the silence period using the knowledge. If the silence period starts ("Yes" path from decision step 602), the controller 511 goes to step 604. If, however, the silence period has not started ("No" path from decision step 602), the controller 511 continues the reverse load power control in step 600.

In step 604, the controller 511 measures the thermal noise power of the silence period. There is no need for reverse load power control during the silence period because no MSs are transmitting data on the reverse link. Therefore, the controller 511 measures the thermal noise power using a reverse power value received from the average calculator 302. The received power value utilizes the power measurement error illustrated in FIG. 4. Hence, the controller 511 measures the thermal noise power by Eq. (3). The controller 511 then decides whether the silence period has ended in decision step 606. If the silence period has ended ("Yes" path from decision step 606), i.e., the non-silence period has started, the controller 511 goes to step 608. If, however, the silence period has not ended ("No" path from decision step 606), the controller 511 continues measuring the thermal noise power. In step 608, the controller 511 reflects the thermal noise power measurement in the previous thermal noise power. The controller 511 can reflect the thermal noise power measurement in the previous thermal noise power in several different ways. For example, the controller 511 can reflect the thermal noise power measurement in the previous thermal noise power by updating the previous thermal noise power with the thermal noise power measurement, by accumulating the thermal noise power values with weights according to a reverse order of time for a predetermined time, or by calculating the average of the thermal noise power values accumulated for a predetermined amount of time. As those skilled in the art can appreciate, other methods for reflecting the thermal noise power measurement in the previous thermal noise power can be utilized for reflecting the thermal noise power measurement in the previous thermal noise power, and are considered to be within the scope of the embodiments of the present invention.

The controller 511 then returns to step 600 in which it controls the reverse link load based on the current thermal noise power value.

As described above, the embodiments of the present invention enable precise measurements of thermal noise power by which to control the load of the reverse link. The precise measurements are obtained by adding a simple circuit to a BTS device, or a simple program to a processor. Therefore, the load of the reverse link can be accurately controlled.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for measuring the received power of a reverse link in a mobile communication system, comprising:
   an unchangeable power measuring block (UPMB) for measuring the received power of the reverse link, accumulating the measured received power, and outputting the accumulated received power as a received power value;
   a remover for compensating the received power value using a time constant if the received power value is for a silence period; and
   a controller for providing a silence period signal to the remover when the silence period starts.

2. The apparatus of claim 1, wherein the remover processes the received power value for the silence period by calculating
   silence period power value-(effective load at the end of non-silence period)*exp(-t/T)
   where T is the time constant of the UPMB, t is time, and the effective load is load imposed by transmitting data on the receiver link from mobile stations (MSs).

3. The apparatus of claim 1, wherein the remover bypasses the received power value received from the UPMB, if the silence period signal is not received.

4. An apparatus for measuring the received power of a reverse link in a mobile communication system, comprising:
   an unchangeable power measuring block (UPMB) for measuring the received power of the reverse link, accumulating the measured received power, and outputting the accumulated received power as a received power value;
   a remover for compensating the received power value using a time constant if the received power value is for a silence period;
   a bypass line for outputting an input power value;
   a switch for switching the received power value received from the UPMB between the remover and the bypass line according to a switching control signal; and
   a controller for generating the switch control signal by which the switch is connected to the remover for a silence period and to the bypass line for a non-silence period.

5. The apparatus of claim 4, wherein the remover processes the received power value for the silence period by calculating
   silence period power value-(effective load at the end of non-silence period)*exp(-t/T)
   where T is the time constant of the UPMB and t is time and the effective load is load imposed by transmitting data on the receiver link from mobile stations (MSs).

6. A method of measuring the received power of a reverse link in a mobile communication system, comprising the steps of:
   measuring the received power of the reverse link, accumulating the measured recieved power, and outputting the accumulated received power as a received power value;
   compensating the received power value using a time constant if the received power value is for a silence period and outputting the compensated received power value as a thermal noise power value for the silence period; and
   calculating a riser over thermal (ROT) power value using the received power value measured for a non-silence period and the thermal noise power value of the silence period.

7. The method of claim 6, wherein the compensation is performed by calculating
   silence period power value-(effective load at the end of non-silence period)*exp(-t/T)
   where T is the time constant of an unchangeable power measuring block (UPMB) and t is time.

8. The method of claim 6, further comprising the step of controlling the load of the reverse link based on the ROT power value.

9. The method of claim 6, further comprising:
   bypassing the step of compensating the received power using a time constant during a non-silence period.

* * * * *